United States Patent
Shakeel et al.

(10) Patent No.: US 10,447,169 B2
(45) Date of Patent: Oct. 15, 2019

(54) INDEPENDENT POWER FACTOR AND FREQUENCY CONTROL OF ELECTRICAL POWER GENERATOR

(71) Applicant: General Electric Company, Schenectady, NY (US)

(72) Inventors: Tabrez Shakeel, Houston, TX (US); Muhammed Rahim, Houston, TX (US); Edward G. Benya, Jr., Houston, TX (US); Otman Dinari, Houston, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/001,945

(22) Filed: Jan. 20, 2016

(65) Prior Publication Data
US 2017/0207716 A1     Jul. 20, 2017

(51) Int. Cl.
*H02M 5/458*       (2006.01)
*H02M 1/42*       (2007.01)
*H02J 3/18*        (2006.01)

(52) U.S. Cl.
CPC .............. *H02M 5/458* (2013.01); *H02J 3/18* (2013.01); *H02M 1/42* (2013.01); *Y02E 10/763* (2013.01); *Y02E 40/34* (2013.01)

(58) Field of Classification Search
CPC ............ H02M 5/00; H02M 5/40; H02M 5/42; H02M 5/44; H02M 5/453; H02M 5/458; H02M 5/4585; H02M 1/12; H02M 1/32; H02M 1/36; H02M 2001/007; H02M 2001/0067; H02M 5/45; H02M 5/4505; H02M 5/451; H02M 5/452; H02M 1/42; H02M 1/4208; H02M 1/4216;
(Continued)

(56) References Cited

U.S. PATENT DOCUMENTS 5,225,712 A    7/1993   Erdman
5,694,026 A    12/1997   Blanchet
(Continued)

OTHER PUBLICATIONS

P. Igic et al., "Multi-megawatt offshore wave energy converters—electrical system configuration and generator control strategy", IET Renewable Power Generation, Jan. 2011.*
(Continued)

*Primary Examiner* — Gary L Laxton
*Assistant Examiner* — Carlos O Rivera-Perez
(74) *Attorney, Agent, or Firm* — Fletcher Yoder, P.C.

(57) ABSTRACT

A system for providing power to a power grid includes a generator configured to output a first voltage associated with a first set of power characteristics. The system includes a power conversion system including a rectifier configured to convert first voltage to a direct current (DC) voltage. The power conversion system includes an inverter comprising one or more switches configured to convert the DC voltage to a second voltage. The system includes a processor configured to receive a second set of power characteristics associated with a power grid. The processor is configured to determine one or more signals configured to cause the switches in the inverter to convert the DC voltage into the second voltage, wherein the second voltage comprises the second set of power characteristics. The processor is configured to send the signals to the switches.

20 Claims, 4 Drawing Sheets

(58) Field of Classification Search
CPC .. H02M 1/4233; H02M 1/4241; H02M 1/425; H02P 27/00; H02P 27/02; H02P 27/04; H02P 27/06; H02P 27/08; H02P 27/16; Y02E 10/70; Y02E 10/72; Y02E 10/721; Y02E 10/723; Y02E 10/725; Y02E 10/76; Y02E 10/763; Y02E 40/34; H02J 3/18

USPC .... 363/15–21.01, 34, 35, 37–50, 55–58, 65, 363/67, 69, 70, 71, 74, 79, 95–99, 363/123–127, 131–134; 323/205–211, 323/266, 271–276, 282–288, 299–303, 323/351, 901, 908; 290/44, 55; 322/24, 322/25, 28, 29, 37; 318/798–803, 318/807–811

See application file for complete search history.

(56) References Cited

U.S. PATENT DOCUMENTS

| | | | |
|---|---|---|---|
| 7,102,247 B2 * | 9/2006 | Feddersen | F03D 9/003 290/44 |
| 7,180,270 B2 | 2/2007 | Rufer et al. | |
| 2005/0012339 A1 * | 1/2005 | Mikhail | F03D 7/0224 290/44 |
| 2006/0214645 A1 | 9/2006 | Rufer et al. | |
| 2007/0024059 A1 * | 2/2007 | D'Atre | F03D 7/0272 290/44 |
| 2009/0096211 A1 * | 4/2009 | Stiesdal | H02J 3/1835 290/44 |
| 2013/0049366 A1 | 2/2013 | Seger et al. | |

OTHER PUBLICATIONS

F. Grigoletto et al., "Flexible Arrangement of Static Converters for Grid-Connected Wind Energy Conversion Systems", IEEE, Sep. 2014, pp. 4707-4721.*

* cited by examiner

INDEPENDENT POWER FACTOR AND FREQUENCY CONTROL OF ELECTRICAL POWER GENERATOR

BACKGROUND

The subject matter disclosed herein relates to power generation, and more particularly, to operating a power generation system independent of a power grid.

In power generation systems, turbines, such as gas turbines or steam turbines, are used with generators to provide power to one or more loads via a power grid. The power grid may operate at a certain frequency, phase, or amplitude. The turbine controls instrumentation synchronizes a power output of the generator with certain characteristics of the power grid. For example, the turbine controls system may adjust fuel usage or other aspects of the turbine to adjust a speed at which a turbine shaft rotates to control the frequency and/or phase of the voltage output from the generator. As such, the turbine may synchronize the voltage output by the generator with the phase and the frequency of the voltage present on the power grid.

In some cases, the turbine may adjust the speed of its shaft using complicated hardware, such as a gearbox, to synchronize the output of the generator with the grid. By using the gearbox, however, the turbine may operate at less efficient speeds to enable the generator to match the grid frequency. For the foregoing reasons, it may be desirable to improve turbine operation in power grids.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, the embodiments may encompass a variety of forms that may be similar to or different from the embodiments set forth below.

In a first embodiment, a system for providing power to a power grid includes a generator configured to output a first voltage associated with a first set of power characteristics, a power conversion system including a rectifier configured to convert first voltage to a direct current (DC) voltage, and an inverter comprising one or more switches configured to convert the DC voltage to a second voltage, and a processor configured to receive a second set of power characteristics associated with a power grid determine one or more signals configured to cause the switches in the inverter to convert the DC voltage into the second voltage, wherein the second voltage comprises the second set of power characteristics, and send the signals to the switches.

In a second embodiment, a power conversion system configured to convert power from a first voltage with a first set of power characteristics associated with operation of a generator to a second voltage with a second set of power characteristics associated with a power grid, wherein the power conversion system includes a rectifier configured to convert the first voltage to a direct current (DC) voltage an inverter including one or more switches configured to convert the DC voltage to a second voltage, and a processor configured to receive the second set of power characteristics associated with the power grid, determine one or more signals configured to cause the switches in the inverter to convert the DC voltage into the second voltage, wherein the second voltage comprises the second set of power characteristics, and send the signals to the switches.

In a third embodiment, a method includes receiving a first voltage associated with a first set of power characteristics output from a generator, converting the first voltage to a direct current (DC) voltage, receiving a second set of power characteristics associated with a power grid, determining one or more signals configured to cause switches of an inverter to convert the DC voltage into a second voltage comprising the second set of power characteristics, and sending the signals to the switches.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
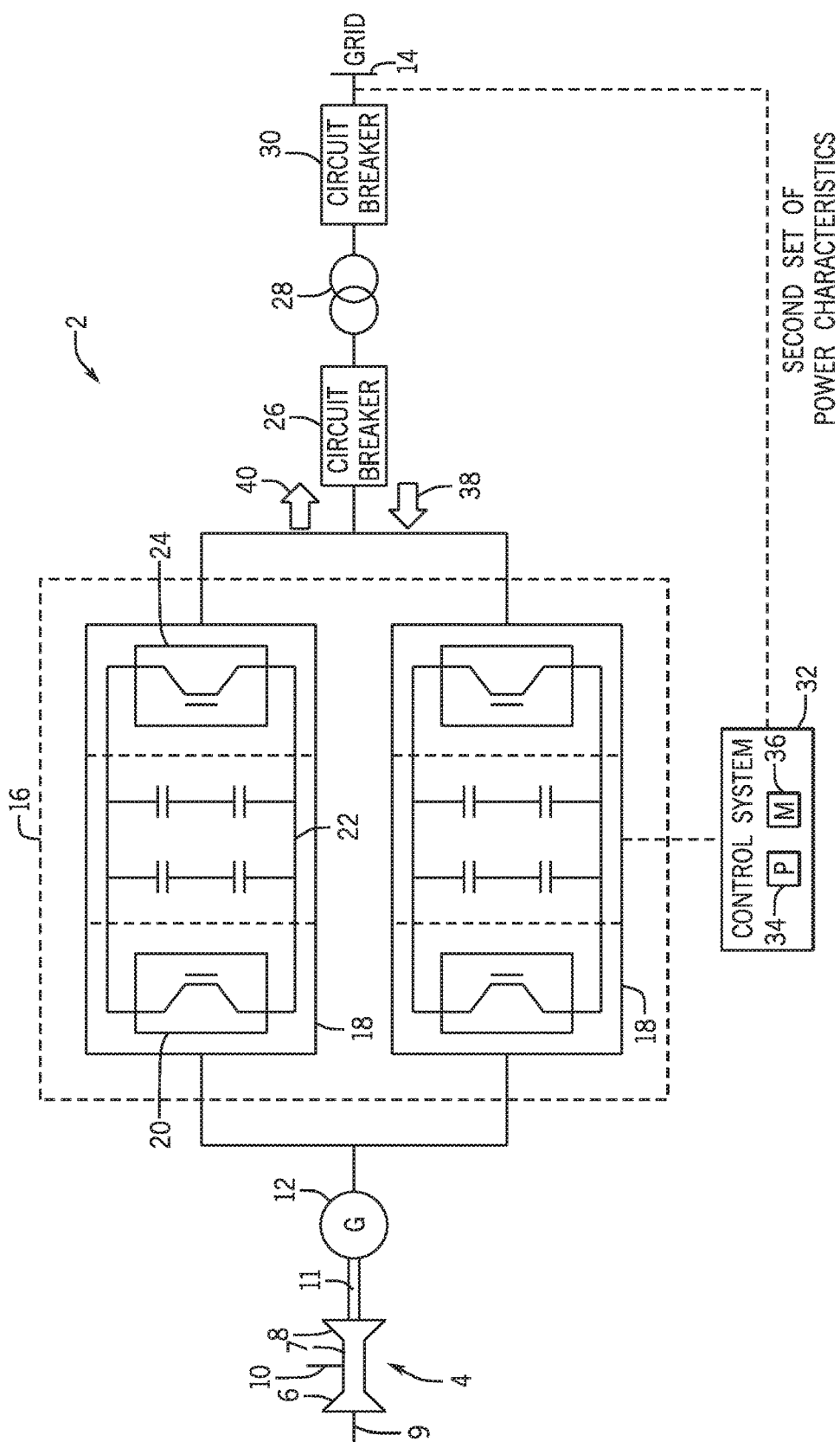
FIG. 1 is a schematic diagram of a power generation system having a power conversion system for a power grid, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Power grids operate at a certain frequency, phase, and amplitude. To provide power at the frequency, phase, and amplitude of the power grid, power generation systems often use speed synchronization hardware, such as a gearbox. For example, gas turbines may use the gearbox to control a frequency of power generated from the gas turbine by controlling speed of rotation of turbine blades. By controlling the gas turbine blade rotation speed, a shaft coupled to the gas turbine blades may be controlled to rotate at a speed that enables a connected generator to output power that corresponds to the frequency, phase, and amplitude of the power grid. That is, gearbox controls the rotation speed of the gas turbine to enable the generator to operate at different grid frequencies. Further, gas turbine generators may be used as synchronous condensers to regulate power factor to the power grid by absorbing or delivering reactive power, but synchronous condensers cannot produce real power. Further, capacitor banks are occasionally deployed at the point of common coupling of the gas turbine generator system with the power grid to augment power factor correction.

However, the gearbox and/or capacitor banks may add more complexity to the power generation system because the gas turbine is tied to operation of the grid. For example, if the grid is operating at 50 Hz, the gas turbine may rotate the shaft at a speed that corresponds to the generator generating power at 50 Hz. While the power generation system provides power at the grid frequency in such cases, the gas turbine may operate more efficiently at frequencies (e.g., rated frequency) other than the frequency of the power grid. For instance, the power generation system may produce power more efficiently (e.g., use less fuel for power generated) by operating at 60 Hz instead of the 50 Hz of the power grid. Further, the capacitor bank may utilize significant space and the increased complexity may be difficult to maintain.

With the foregoing in mind, in certain embodiments, a power conversion system may enable power generation systems to provide power to a power grid without the use of speed reduction and/or synchronization hardware. For example, the power generation system may provide power to the power grid, without utilizing a gearbox, by using the power conversion system that enables the power generation system to operate independent of the power grid. That is, the power conversion system may receive power from the power generation system having one or more first power characteristics, and the power conversion system may transform the received power to and provide transformed power to the power grid having one or more second characteristics to enable the gas turbine of the power generation system to operate independent of the one or more second power characteristics.

By way of introduction, FIG. 1 is a diagram of a power generation system 2 that includes a gas turbine system 4. Although the gas turbine system 4 is described in detail herein, it is simply used as an example and any power generation system for generating power may be used. The gas turbine system 4 may include one or more compressors 6, a combustor 7, and one or more turbine blades 8. The compressor 6 may compress an oxidant (e.g., air, oxygen, oxygen-enriched air, or oxygen-reduced air) to provide a compressed oxidant to the combustor 7. The compressed oxidant and a fuel 10 may be combined to form an air-fuel mixture. The combustor 7 may combust the air-fuel mixture to rotate the one or more turbine blades 8. As an example, the gas turbine system 4 may include an LM6000 gas turbine, available from General Electric Company of Schenectady, N.Y. The one or more turbine blades 8 may be coupled to a shaft 11 that rotates and provides rotational energy for a generator 12.

The generator 12 may convert rotational energy from rotation of the shaft 11 to electrical power. In conventional systems, a gearbox may be included between the gas turbine system 4 and the generator 12 to adjust a speed at which the shaft 11 rotates. However, the gearbox may add more complexity to providing power because the gas turbine system 4 is tied to operation of the power grid 14. That is, to produce power on the power grid 14, the shaft 11 of the gas turbine system 4 may rotate at a certain speed that corresponds to the generator outputting a voltage at the same phase and frequency of the power grid 14. In embodiments described herein, the generator 12 may be electrically coupled to the power grid 14 without a gearbox between the gas turbine system 4 and the generator 12 by using a power conversion system 16. As such, the power conversion system 16 may enable the gas turbine system 4 and/or the generator 12 to operate independent of characteristics of the power grid 14. Further, the power conversion system 16 may enable the gas turbine system 4 to operate at an optimum speed without the use of the gear box.

Keeping the foregoing in mind, the generator 12 may be coupled to the power conversion system 16 that converts one or more characteristics of power output by the generator 12 and provided to the power grid 14, such that the gas turbine system 4 and/or the generator 12 may operate independent of the power characteristics of the power grid 14. For example, the power conversion system 16 may convert 60 Hz power output by the generator 12 to 50 Hz, which corresponds to the power characteristics of the power grid 14. As such, the power conversion system 16 may provide power at a phase and/or amplitude corresponding to the phase and/or amplitude of power on the power grid 14. By adjusting the power output by the generator 12 based on the characteristics of the power grid 14 via the power conversion system 16, the generator 12 and/or the gas turbine system 4 may operate independently of the power grid 14, and thus more efficiently. That is, for example, the turbine 4 and the generator 12 may be rated or designed to operate at a particular frequency (e.g., 60 Hz). By using the power conversion system 16 to synchronize the power output by the generator 12 with the power of the power grid 14, the power conversion system 2 may enable the turbine 4 and the generator 12 to operate at its rated specifications, as opposed to less efficient specifications.

With this in mind, the power conversion system 16 may include one or more variable frequency converters 18 that control power characteristics (e.g., frequency, phase, and/or voltage) output by the generator 12. The variable frequency converter 18 may be a medium voltage converter, such as an MV7000, available from General Electric Company of Schenectady, N.Y. In some embodiments, the variable frequency converter 18 may include a pre-assembled and/or standardized converter to facilitate incorporating the variable frequency converter 18 in the power generation system 2. The variable frequency converter 18 may include a rectifier 20 that converts the power generated by the generator 12 from alternating current (AC) power to direct current (DC) power. The converted power generated by the generator 12 may provide power to a DC bus 22. Through the use of one or more switches, the power on the DC bus 22 may then be converted into an AC power by an inverter 24. In some embodiments, the inverter 24 may be instructed to convert the DC power into an AC power that matches the characteristics of power on the power grid 14. As such, a control system 32, for example, may coordinate the switching of the switches in the inverter 24 to cause the output power to have certain power characteristics.

The power conversion system 16 may be coupled to a transformer 28 via a circuit breaker 26 (e.g., 52G). The transformer 28 may be a generator step-up (GSU) transformer that steps up the voltage for transmission to various loads on the power grid 14. The transformer 28 may then be coupled to the power grid 14 via a utility circuit breaker 30 (e.g., 52U). While FIG. 1 shows the circuit breakers 26 and 30 and transformer 28 coupling the power conversion system 16 to the power grid 14, these are merely used as examples. Any suitable device may be used to couple the power conversion system 16 to the power grid 14 to allow the generator 12 to provide power to the power grid 14 via the power conversion system 16.

As mentioned briefly above, the power generation system 2 may include a control system 32 having a processor 34 or multiple processors, memory 36, and inputs and/or outputs to send and/or receive signals from and/or to the power conversion system 16. The processor 34 may be operatively coupled to the memory 36 to execute instructions for carrying out the presently disclosed techniques. These instructions may be encoded in programs or code stored in a tangible non-transitory computer-readable medium, such as the memory 36 and/or other storage. The processor 34 may be a general-purpose processor, system-on-chip (SoC) device, or application-specific integrated circuit, or some other processor configuration.

Memory 36 may include a computer readable medium, such as, without limitation, a hard disk drive, a solid state drive, a diskette, a flash drive, a compact disc, a digital video disc, random access memory (RAM), and/or any suitable storage device that enables processor 34 to store, retrieve, and/or execute instructions and/or data. Memory 36 may further include one or more local and/or remote storage devices.

The control system 32 may be programmed or configured (e.g., performed via the processor 34 and the memory 36) to control operation of the rectifier 20, and/or the inverter 24 of the power generation system 2. The processor 34 of the control system 32 may send and/or receive signals to control power provided from the inverter 24 to the power grid 14. For example, the inverter 24 may include one or more switches, such as insulated gate bipolar transistors (IGBTs), metal oxide-semiconductor field effect transistors (MOSFETs), or the like. The processor 34 may receive a signal indicating the frequency, phase, and/or amplitude of the power grid 14. The processor 34 may control operation of the switches of the inverter 24 (e.g., a voltage source inverter) to provide AC power based on the frequency, phase, and/or amplitude of the power grid 14. As such, the processor 34 controls the frequency, phase, and/or amplitude output by the power conversion system 16 and provided to the power grid 14 independent of operation of the generator 12 and the turbine 4.

By utilizing the power conversion system 16, one or more power characteristics of the gas turbine system 4 and/or the generator 12 may be isolated from characteristics of the power grid 14, thereby enabling the generator 12 to generate power at a desired frequency, phase, amplitude, or the like. Further, the processor 34 may receive a signal indicative of reactive power 38 of the power grid 14. The processor 34 may then regulate reactive power 40 (e.g., via control of switches of the inverter 24) provided to the power grid 14 by the power conversion system 16 based on the reactive power 38 to stabilize the power grid 14. As such, the generator 12 may operate at unity power factor (e.g., power factor equal to 1) independent of the reactive power output of the power conversion system 16.

In some embodiments, the power conversion system 16 may include multiple variable frequency converters 18 coupled in parallel. As such, each variable frequency converter 18 may be designed to withstand a certain amount of power or voltage output. If the voltage or power output of the generator 12 exceeds the amount of power or voltage for a single variable frequency converter 18, it may be desirable to couple multiple variable frequency converters 18 in parallel to increase power output of the power conversion system 16. Additionally and/or alternatively, including multiple variable frequency converters 18 in parallel may improve redundancy in the system. While two variable frequency converters 18 coupled in parallel are shown in FIG. 1, any number of variable frequency converters suitable for the generator 12 may be used. For example, on smaller generators, a single variable frequency converter 18 may be used, and in larger generators, three, four, or more variable frequency converters 18 may be coupled in parallel.

The power conversion system 16 isolates the gas turbine system 4 and/or the generator 12 from the power grid 14, thereby allowing power factor provided to the power grid 14 to be controlled independent of the gas turbine system 4 and/or the generator 12 output. Moreover, the power conversion system 16 limits an inrush of current during transformer 28 energization. For example, by isolating the generator 12 from the power grid 14, the power conversion system 16 limits current output by the generator 12 and provided to the transformer 28 during start up. Further, the power conversion system 16 may limit current provided by the generator 12 during a short circuit event to a maximum current. That is, the short circuit event may include an event where current is limited by parts of the power generation system 2 (e.g., resistance of the transformer) that were not designed to limit current. If a short circuit event is detected, the processor 34 may control (e.g., open) the switches of the inverter 24 when current exceeds a threshold to prevent current through the switches from exceeding a current limit during the short circuit event, thereby preventing the generator 12 from providing current greater than the maximum current.

Figure 2:
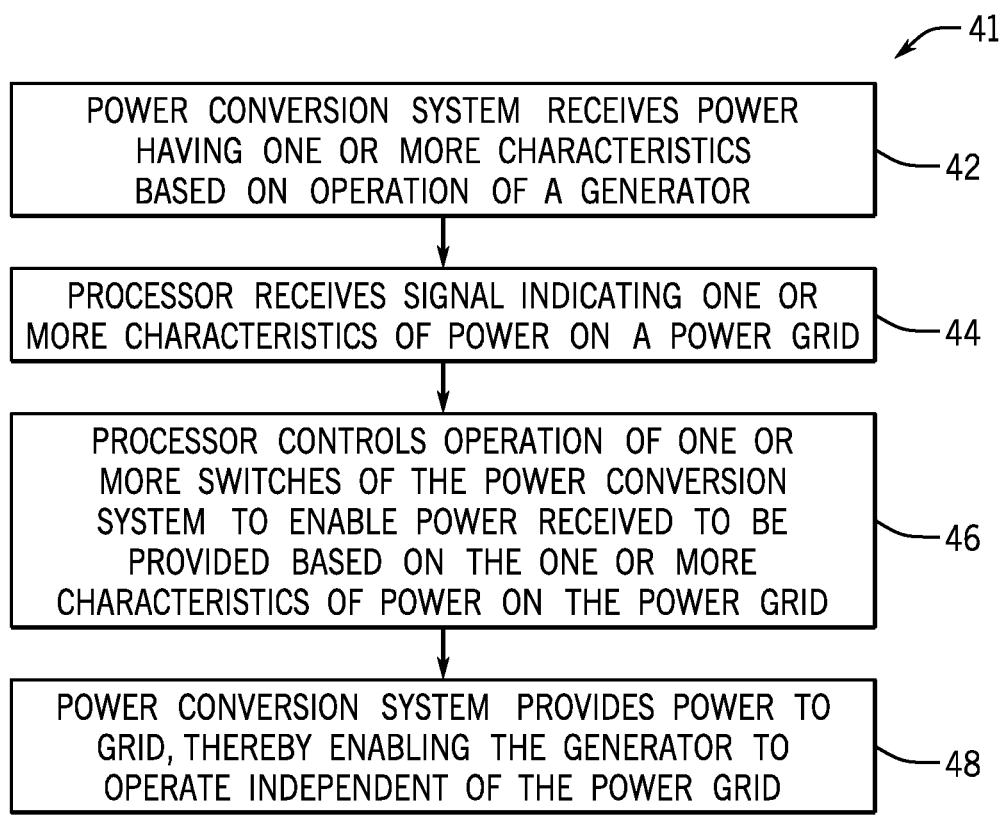
FIG. 2 is a flow chart of a process performed by the power conversion system of FIG. 1, in accordance with an embodiment.

FIG. 2 is a block diagram of a process 41 performed by the control system 32 of the power conversion system 16 to enable the gas turbine system 4 and/or the generator 12 to operate at one or more power characteristics independent of the power grid 14. These operations may be implemented in software (e.g., code) and/or hardware. As such, at block 42, the processor 34 of the power conversion system 16 may receive certain power characteristics regarding an operation of the generator 12 from one or more sensors disposed on the generator 12.

At block 44, the processor 34 may then receive a signal indicating one or more grid power characteristics of the power grid 14 from one or more sensors disposed on the grid. As used herein, the grid power characteristics and/or the generator power characteristics may include a voltage, current, frequency, phase, amplitude, real power, reactive power, power factor, or other characteristic of power from the power grid 14 or the generator 12.

At block 46, the processor 34 may control operation of one or more switches of the voltage source inverter 24 of the power conversion system 16 to enable power received by the power conversion system 16 to be output based on the one or more grid power characteristics. That is, the processor 34 may control firing angles of the switches such that the switches produce reactive power to meet the reactive power demand of the power grid 14. Alternatively and/or additionally, the generator may produce reactive power by adjusting a terminal voltage of the generator. The power conversion system 16 may then provide power to the power grid 14, thereby enabling the generator 12 to operate independent of the power grid 14 (block 48).

As the generator 12 produces less reactive power, power generation losses may decrease. By controlling operation of the one or more switches of the voltage source inverter 24, the processor 34 may control the power conversion system 16 to provide reactive power to the power grid 14, enabling the gas turbine generator system 4 to operate more efficiently when the generator 12 produces less reactive power. That is, the processor 34 may control the power conversion system 16 to enable the generator 12 to operate in a more efficient manner when the generator 12 produces reactive power. Further, by controlling the power conversion system 16 to provide reactive power to the power grid 14, the processor 34 may enable the generator 12 to operate at unity power factor.

Figure 3:
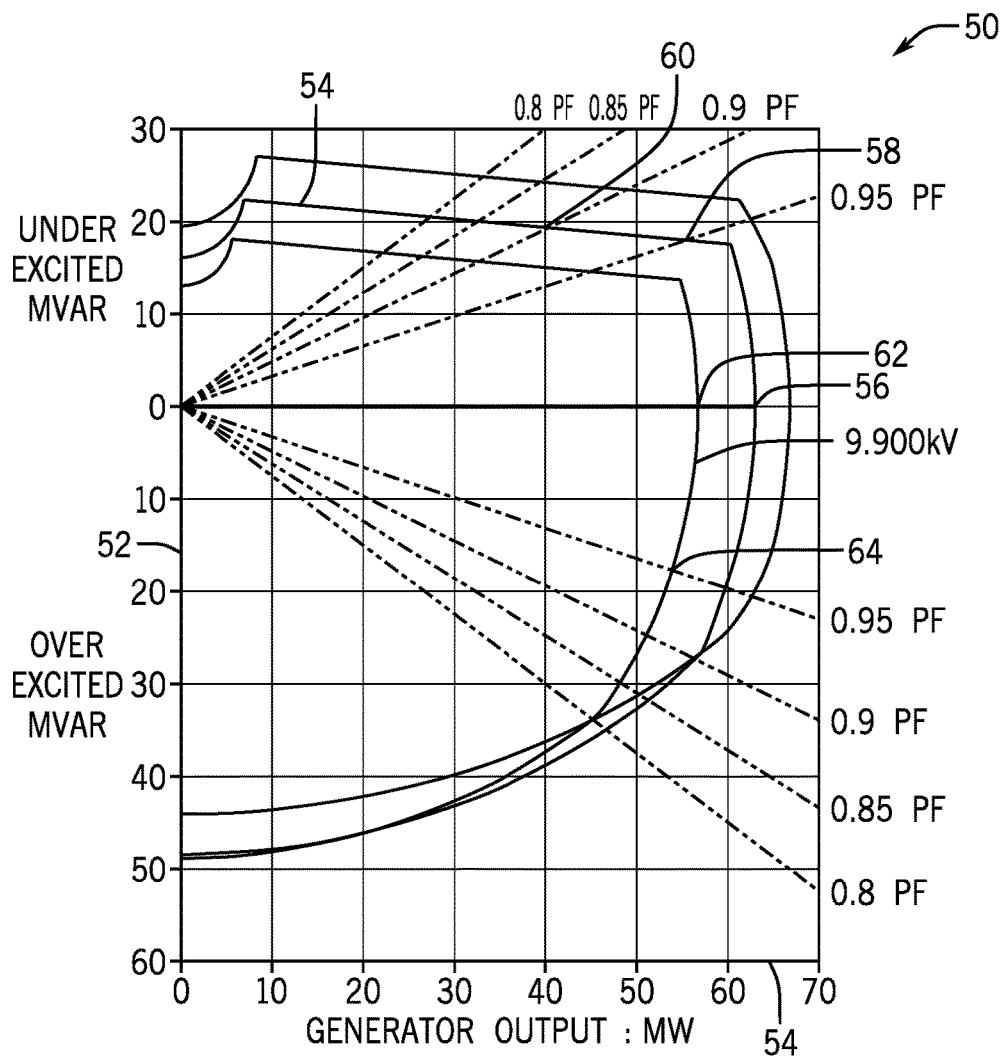
FIG. 3 is a graph of power output of the power generation system using the power conversion system of FIG. 1, in accordance with an embodiment.

FIG. 3 is a graph 50 of power output of the power generation system 2 with various reactive power outputs 52 (e.g., over excited and/or under excited reactive power) and real power output 54 of the generator 12. While numbers are used below as examples for the generator 12, any suitable generator 12 that generates more power when operating at higher power factors may be used. As shown in graph 50, the generator 12 may generate both reactive power (e.g., mega volt-ampere reactive (MVAR)) with respect to various real power (e.g., megawatt (MW)) generator outputs. As power factor describes a ratio of real power (e.g., MVAR) to apparent power, the graph 50 shows power factors of the generator 12 while operating at various MVAR and MW outputs. As the generator 12 produces less reactive power, the efficiency of the generator 12 increases.

As shown in FIG. 3, the generator 12 may generate power at various operating points along line 54. For example, the generator 12 may produce 63 MW of real power at an operating point 56 at unity power factor. If the generator 12 produces more reactive power (e.g., under excited or over excited), the power factor and the real power generated by the generator 12 may be reduced. For example, at operating point 58, the generator 12 produces a power factor of 0.95, having a reactive power of approximately 18 MVAR and real power of approximately 56 MW. Moreover, as power factor further decreases, real power generated by the generator 12 continues to decrease. For instance, at operating point 60, the generator 12 produces increasingly less real power at a lower power factor of 0.90 than the power produced at operating point 58. That is, the generator 12 produces less power at power factors less than at unity power factor. As another example, a smaller generator may produce less real power at the operating point 62 for unity power factor as well as produce less power at operating point 64 having a power factor of 0.95 compared to the generator 12 at operating point 58 having the same power factor. The generator 12 may operate at the optimal operating point 56 for generating real power because the power conversion system 16 provides power based on characteristics of the power grid 14. That is, the power conversion system 16 may enable the generator 12 to operate at unity power factor while the grid operates at a lower power factor. By isolating the generator 12 from the power grid 14 per the power conversion system 16 of FIG. 1, the efficiency of the generator is increased.

Figure 4:
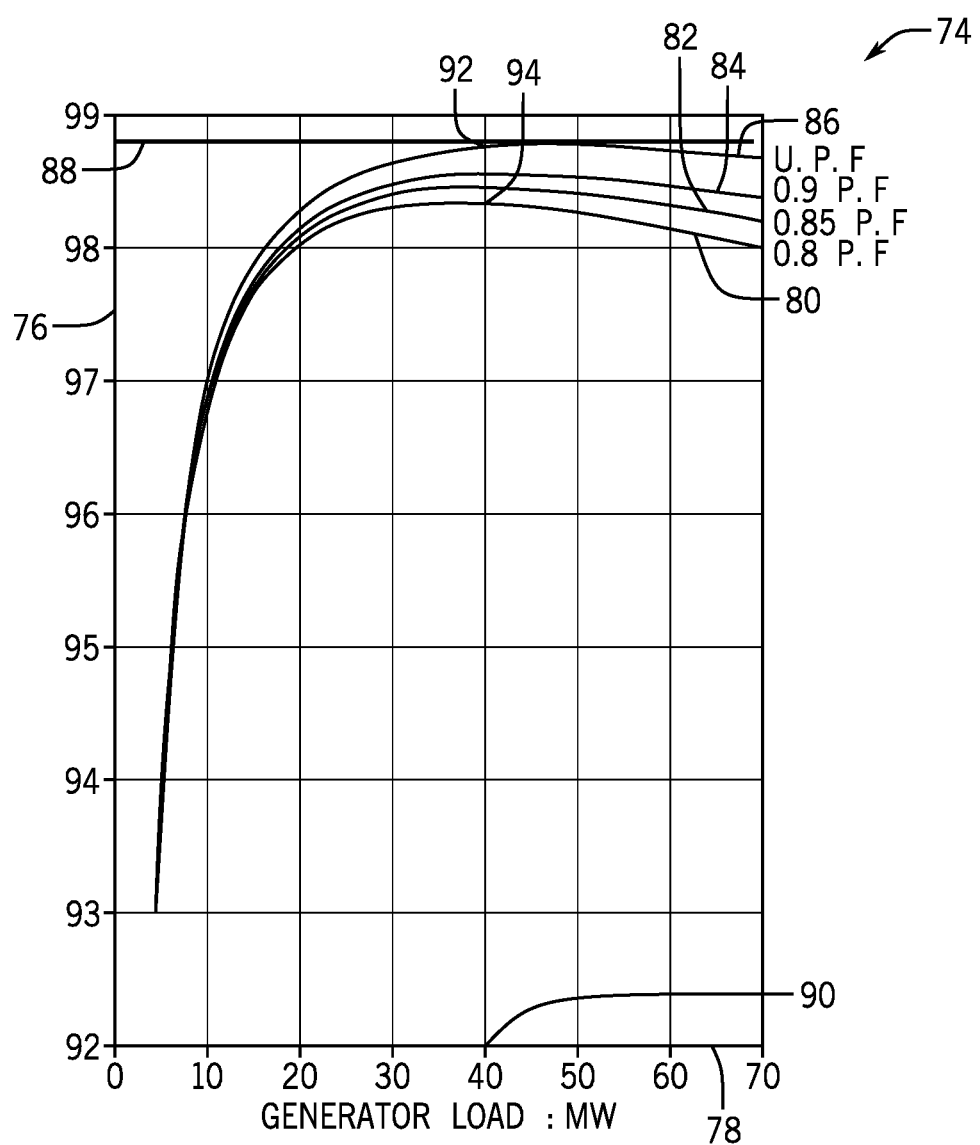
FIG. 4 is a graph of efficiency of the power generation system using the power conversion system of FIG. 1, in accordance with an embodiment.

FIG. 4 is another graph 74 showing efficiency 76 of the generator 12 with respect to generator loads 78 at various power factors. For example, the power grid 14 may include reactive power as well as real power such that the power grid 14 has a grid power factor 80 of 0.80. While a 0.80 power factor is described below as the grid power factor, the grid power factor herein is used merely as an example, and the power conversion system 16 may be used with any suitable power grid having any power factor. The power conversion system 16 may isolate the generator 12 from the power grid 14 to enable the generator 12 to operate at a power factor independent of the grid power factor line 80. For example, the power conversion system 16 may enable the generator 12 to operate at a power factor, such as a 0.85 power factor 82 or 0.9 power factor 84, independent of and/or greater than the 0.80 grid power factor line 80. Moreover, the efficiency 76 of the generator 12 may increase due to the generator 12 operating at the higher power factor than the grid power factor. That is, by isolating the generator 12 from the power grid 14, the power conversion system 16 may improve efficiency of the generator 12 by enabling the generator to operate at a higher power factor, such as a 0.9 power factor line 84, as compared to the grid power factor line 80, such as the 0.80 power factor. Further, as shown in FIG. 4, the power conversion system 16 may enable the generator 12 to operate at unity power factor to operate at an optimal efficiency 88 of the generator 12 (e.g., higher efficiency than 0.8 power factor line 80, 0.85 power factor line 82, and 0.9 power factor 84). That is, the power conversion system 16 may enable the generator 12 to generate an amount of power 90 at a higher power factor (e.g., unity power factor 86) at a more efficient operating point 92 based on a design of the generator 12, as compared to an operating point 94 based on the grid power factor.

Technical effects of the disclosure include converting power from one form to another. In an embodiment, the power conversion system receives power having one or more characteristics based on operation of a generator. The power conversion system converts the power to have one or more power characteristics of the power grid, different from the one or more characteristics of the power based on operation of the generator. The power conversion system enables the generator to provide power according to operation of the power grid without using a gearbox. For example, the power conversion system may enable the generator to operate at unity power factor when the power grid is operating at a different power factor, thereby enabling the generator to operate more efficiently.

This written description uses examples to disclose various embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for providing power to a power grid, comprising:
   a gas turbine configured to continuously operate a first speed, thereby continuously rotating a shaft of the gas turbine at a second speed;
   a generator coupled to the shaft, wherein the generator is configured to:
   continuously operate at a unity power factor and with a fixed frequency corresponding to the second speed while a reactive power demand of a load on the power grid varies;
   output a first voltage signal associated with a first set of power characteristics based on the fixed frequency, wherein the first set of power characteristics comprises a first frequency, a first phase, and a first amplitude of the first voltage signal; and
   a power conversion system configured to output a second voltage signal associated with a second set of power characteristics comprising a second frequency, a second phase, and a second amplitude of the second voltage signal that are based on a variable frequency, wherein the first voltage signal output by generator and the second speed of the shaft operates independently with respect to the second set of power characteristics, wherein the power conversion system comprises:
  a rectifier configured to convert the first voltage signal to a direct current (DC) voltage; and
  an inverter comprising one or more switches configured to convert the DC voltage to the second voltage signal to output to the power grid; and
a processor configured to:
  receive a third set of power characteristics comprising the reactive power demand associated with the power grid and the variable frequency associated with the power grid;
  determine one or more signals configured to cause the switches in the inverter to adjust the second voltage signal based on the third set of power characteristics independent of the first set of power characteristics, wherein the signals are configured to modify one or more firing angles of the switches, thereby causing the inverter to adjust the second voltage signal to provide a reactive power that substantially matches the reactive power demand of the power grid while the generator continuously operates at the unity power factor and while the shaft continuously rotates at the second speed; and
  send the signals to the switches.

2. The system of claim 1, wherein the processor is configured to determine the one or more signals based on a power factor associated with the power grid.

3. The system of claim 1, wherein the power conversion system is configured to control operation of the one or more switches of the power conversion system based on the frequency associated with the power grid.

4. The system of claim 1, comprising a first frequency conversion device and a second frequency conversion device coupled in parallel with each other, wherein the first frequency conversion device comprises the rectifier and the inverter.

5. The system of claim 4, wherein the second frequency conversion device comprises a second inverter configured to provide the power based on the second voltage signal.

6. The system of claim 1, wherein the generator is configured to provide the power to the power grid without a gearbox.

7. The system of claim 1, wherein the processor is configured to send one or more open signals to the switches to cause the switches of the inverter to open when current exceeds a threshold.

8. The system of claim 1, comprising the gas turbine configured to operate at a fixed speed associated with the fixed frequency.

9. The system of claim 8, wherein the fixed speed corresponds to a rated speed of the gas turbine.

10. The system of claim 1, wherein the first set of power characteristics comprises real power and reactive power.

11. The system of claim 1, wherein the processor is configured to:
  determine one or more open signals configured to cause at least a portion of the switches in the inverter to open in response to energization of a transformer coupled to the power conversion system, wherein the one or more open signals are configured to limit an inrush current to the transformer; and
  send the one or more open signals to the at least a portion of the switches.

12. A power conversion system configured to convert power from a first voltage signal associated with operations of a generator, to a second voltage signal associated with a power grid, wherein the power conversion system comprises:
  a rectifier configured to convert the first voltage signal to a direct current (DC) voltage, wherein the first voltage signal is associated with a first set of power characteristics comprising a first frequency, a first phase, and a first amplitude of the first voltage signal, wherein the first set of power characteristics is output by the generator continuously operating at a fixed frequency associated with a first rotation speed of a shaft of a gas turbine coupled to the generator and controlled by the gas turbine configured to continuously operate at a second rotation speed;
  an inverter comprising one or more switches configured to convert the DC voltage to the second voltage signal output to the power grid, wherein the second voltage signal is associated with a second set of power characteristics comprising a second frequency, a second phase, and a second amplitude of the second voltage signal based on a variable frequency, wherein the second voltage signal is output independent of the first voltage signal output by the generator and the first rotation speed of the shaft; and
  a processor configured to:
    receive a third set of power characteristics comprising a reactive power demand associated with the power grid and the variable frequency associated with the power grid;
    determine one or more signals configured to cause the switches in the inverter to adjust the second voltage signals based on the third set of power characteristics without regard to the first set of power characteristics, wherein the signals are configured to modify one or more firing angles of the switches, thereby causing the inverter to adjust the second voltage signal to provide a reactive power that substantially matches the reactive power demand of the power grid while the generator continuously operates at a unity power factor independent of an operation of the power conversion system and while the shaft continuously rotates at the first rotation speed, and wherein the generator is configured to continuously operate at the unity power factors while the reactive power demand of the power grid varies; and
    send the signals to the switches.

13. The power conversion system of claim 12, wherein the processor is configured to determine the one or more signals based on the reactive power demand of the power grid.

14. The power conversion system of claim 12, wherein the processor is configured to determine the one or more signals to cause the power conversion system to provide the reactive power to the power grid during a voltage transient event.

15. The power conversion system of claim 12, wherein the processor is configured to determine one or more second signals configured to limit current through the switches from exceeding a current limit during a short circuit event.

16. The power conversion system of claim 12, wherein the processor is configured to:
  determine one or more open signals configured to cause at least a portion of the switches in the inverter to open to prevent the generator from outputting a current greater than a threshold, wherein the threshold is determined based on one or more properties of the power conversion system; and send the one or more open signals to the at least a portion of the switches in response to determining that the current will exceed the threshold.

17. A method, comprising: receiving a first voltage signal associated with a first set of power characteristics output by a generator operating at a fixed frequency associated with a unity power factor of the generator, wherein the first set of power characteristics comprises a first frequency, a first phase, and a first amplitude of the first voltage signal based on the fixed frequency, wherein the fixed frequency is associated with a first speed of a shaft of a gas turbine coupled to the generator, wherein the first speed is controlled by the gas turbine configured to continuously operate at a second speed; converting the first voltage signal to a direct current (DC) voltage; receiving a second set of power characteristics comprising a second frequency, a second phase, and a second amplitude of a reactive power demand associated with a power grid and based on a variable frequency associated with the power grid; determining one or more signals configured to cause switches of an inverter to provide a second voltage signal output to the power grid based on the second set of power characteristics independent of the first voltage signal and the first speed, wherein the signals are configured to modify one or more firing angles of the switches, thereby causing the inverter to adjust the second voltage signal to provide a reactive power that substantially matches the reactive power demand of the power grid while the generator continuously operates at the unity power factor independent of a power factor of the power grid and while the shaft continuously operates at the first speed, wherein the generator continuously operates at the unity power factor when the reactive power demand of the power grid varies; and sending the signals to the switches.

18. The method of claim 17, comprising limiting an inrush current during energization of a transformer that couples the generator to the power grid.

19. The method of claim 17, comprising sending one or more open signals to the switches to cause the switches of the inverter to open when current exceeds a threshold.

20. The method of claim 17, comprising providing the reactive power to the power grid during a voltage transient event.

* * * * *